Nov. 24, 1970

W. T. WALTERS ET AL 3,543,144

MAGNETIC INSPECTION APPARATUS FOR WELL PIPE UTILIZING DETECTOR SHOES WITH OUTRIGGERS AND MAGNETIC LATCHING MEANS FOR SAID SHOES

Filed Sept. 23, 1968

D. D. Nagel
W. T. Walters
INVENTORS

BY Arnold, Roylance,
Kruger & Durkee

ATTORNEYS

United States Patent Office 3,543,144
Patented Nov. 24, 1970

3,543,144
MAGNETIC INSPECTION APPARATUS FOR WELL PIPE UTILIZING DETECTOR SHOES WITH OUTRIGGERS AND MAGNETIC LATCHING MEANS FOR SAID SHOES
William T. Walters and Dave D. Nagel, Houston, Tex., assignors to American Machine & Foundry Company, New York, N.Y., a corporation of New Jersey
Filed Sept. 23, 1968, Ser. No. 761,604
Int. Cl. G01r 33/12
U.S. Cl. 324—37                4 Claims

ABSTRACT OF THE DISCLOSURE

This application discloses a downhole inspection sonde of the type used for detecting cracks and flaws in the metal casing of an oil well or the like. Magnetic flux leakage detection is used, and a magnetizer having axially-spaced cylindrical pole pieces is effective in saturating the ferromagnetic casing. An array of detectors having an improved detector shoe configuration is positioned around the core of the magnetizer between the pole pieces to scan the casing walls.

---

Oil and gas wells are usually lined during or after completion of drilling with steel casing. Depending upon the structure of the various formations through which the well passes, the casing may extend only partially, or all the way to the bottom of the hole. For deep wells, the diameter of casing used would step down for increasing depth, just as the diameter of the hole drilled would be stepped down. For example, a hole going down 20,000 feet may be perhaps 24" diameter for the first few hundred feet and taper to perhaps 6 to 8" at the bottom, using standard sizes of casing for the various sections in between.

A well which has been drilled and cased in a producing field may be active for many, many years. Using various secondary recovery techniques, and perhaps producing in sequence from several reservoirs at different vertical levels in succession, the working lifetime of the well is extended. Also the requirement of producing at much less than the maximum rate for conservation purposes, as defined by the allowables, requires the well to be in operable condition for many additional years.

The steel well casing would of course be tested for defects before being placed in the well, but the extended lifetime subjects the casing to corrosion pitting, electrolytic pitting, fatigue failure due to the pressures involved, various stresses due to shifting of the earth formations, and other factors which may cause rupture or serious danger of failure of the casing. It is for these reasons necessary to inspect or log a well to determine the conditions of the well casing. This is especially true prior to investing in a secondary recovery technique for the well. In some cases a defective casing might be repaired, or in other situations the well might be abandoned rather than attempting to replace the casing. In either event the condition must be detected.

The apparatus for inspection of the well casing must in some manner be adapted to withstand the immense pressures which occur at the depths of the well, the pressure of course depending upon the depth of the well and reaching magnitudes of perhaps 12,000 p.s.i. or more. Usually an inspection device, sometimes referred to as a "sonde," is lowered down the well while the condition of the casing is recorded as various inspection devices scan the casing wall, the detected information being conveyed back up to the well head through conductors in the cable which supports the sonde. Since the sonde may be lowered into well casings extending for as deep as a few miles underground, the number of conductors in the cable, as well as the weight of the sonde, must be kept at a minimum to in turn reduce the necessary weight of the cable itself. To reduce the number of conductors in the supporting cable, the many channels of signals derived from the detectors which scan the casing wall, for full 360° scan, are processed and combined or multiplexed within the sonde itself. This requires that sealed chambers be provided within the sonde, hermetically sealed against the well pressure, to house the electronic components for the signal processing channels. These sealed housings of course add to the bulk and weight of the sonde.

Magnetic inspection is employed, and this requires a magnetizer to produce flux to saturate the ferromagnetic casing in the vicinity of the inspection operation. Since the casing is itself fairly thick, the size of the core needed in the magnetizer to saturate the casing approaches a large fraction of the interior diameter of the casing itself. This requirement becomes critical since the detectors usually must be positioned within the same cross-sectional space as the iron of the magnetizer core, and so the detectors and their mounting arrangements must be made of minimum radial volume. Of course the detector shoes must resiliently engage the casing wall to account for changes in casing diameter and to permit bypassing obstructions. Also, a passageway sealed against the immense pressure differentials must extend through most of the length of the sonde assembly for connections to the detectors and all of the electronic circuitry as well as to the magnetizer winding. This passageway of course occupies cross-sectional area of the magnetizer core required for saturating the casing wall.

In view of the foregoing, it is a primary feature of the present invention to provide inspection apparatus for well casings or the like which is adapted for deployment at the maximum depth likely to be encountered in a typical well. Another feature is to provide an inspection device using flux leakage detection and including a magnetizer capable of saturating the casing wall while providing sealed chambers for the electronic circuitry and providing an array of resiliently mounted flux leakage detectors to provide full 360° scanning. An additional feature is the provision of centralizer assemblies positioned to maintain the detector apparatus and magnetizers centered along the axis of the casing, while providing sufficient volume in the sealed housing for the electronic components. An important feature is the construction of the detector shoes used for the inspection apparatus to provide full circumferential scanning for varying pipe diameters, along with a short overall length for the detector array, but avoiding problems of damage to the detector shoes by gaps at junctures between sections of the casing.

In accordance with a preferred embodiment of the invention, these and other features are provided in casing inspection apparatus which includes a long cylindrical magnetizer having pole pieces of cylindrical shape which couple flux into the casing wall, a magnetizer winding surrounding a core extending between the pole pieces. Detector shoes positioned in an array surrounding the core scan for flux perturbations caused by flaws, and the electrical conductors for the detectors and for energizing the magnetizer winding are coupled into a passageway within the core in a sealed manner, the interior of the apparatus being sealed to withstand well pressure. The conductors for the detectors are sealed by axially extending connector devices, rather than radially extending sealed connectors which would restrict the core area. The detectors are spring mounted by flat springs occupying little of the central diameter. A unique hold-in technique permits the detector shoes to be retracted while the sonde is lowered down-hole, then extended for the logging run, i.e. as the sonde is pulled back up the hole. Centralizers are positioned above and below the pole pieces, and the interior space within the centralizers is used for the high power dissipation portions of the electronics system. The symmetrical housings for the electronic components are sealed against well pressure, but access is permitted by sliding sealed collars. An important feature of the invention is the reduced axial length of the assembly, permitting lighter weight and less power dissipation in the magnetizer. This is provided in part by unique detector shoe structures which use short detector housings but employ outriggers which extend the effective detector shoe length to avoid damage at gaps where pipe is joined.

Novel features which are believed characteristic of this invention are set forth in the appended claims. The invention itself, however, as well as further features and advantages thereof, may best be understood by reference to the following detailed description of particular embodiments, when read in conjunction with the accompanying drawings, wherein:

Figure 1:
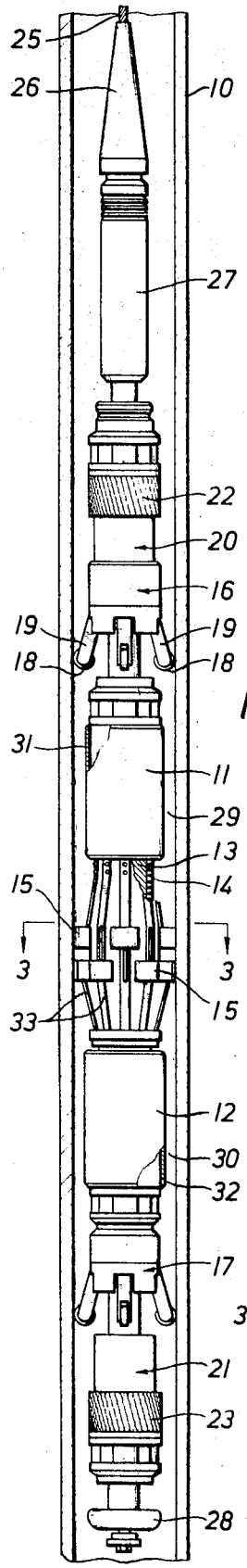
FIG. 1 is an elevation view of the entire inspection assembly of the invention in place within a well casing.

With reference to FIG. 1, an inspection device according to the invention is shown in an operative position within a well casing 10, the well casing being of course surrounded by rock or other earth formation and extending many thousands of feet underground. The inspection device used in this apparatus or sonde includes upper and lower magnetic pole pieces 11 and 12 which are elongated cylindrical members for coupling magnetic flux into the pipe, evenly distributed around the circumference of the wall of the casing or pipe. The flux is generated within a magnetic core 13 by a winding 14 surrounding the core. The magnetic flux flows through a closed loop including the core 13, the pole pieces 11 and 12, and the wall of the casing surrounding the pole pieces, along with the cylindrical section of the casing between the pole pieces 11 and 12. Spring mounted in a central location between the pole pieces in a manner as will be described is a plurality of detector shoes 15 containing suitable transducers for detecting the magnetic flux as may be deflected out of the casing by flaws, cracks, voids, corrosion pits or other anomalies in the metal casing. These detectors are positioned in a staggered, overlapping array to produce full 360° scanning of the casing. The manner of suspending the detector shoes and providing electrical connections to all of the transducers while maintaining an hermetic seal against the vast pressures encountered, as well as the configuration of the detector shoes themselves, are important features of the invention and will be described in detail below, following an overall description of the entire inspection assembly or sonde.

The magnetizer including the pole pieces 11 and 12, and the detector arrangement including the shoes 15, are positioned between a pair of centralizer assemblies 16 and 17 which function to maintain the inspection device centered along the axis of the casing 10. The magnetizer arrangement will cause the device to be attracted to the metal walls, and might tend to pull the assembly into direct engagement with one side of the casing, this tendency being opposed by the centralizers 16 and 17. The upper centralizer 16 includes six wheels 18 positioned on arms 19 which are spring biased in an outward position. The lower centralizer assembly 17 is constructed exactly like the upper assembly. In place of the devices shown with wheels, centralizers of the type having collars and spring-like members may be used as sold under the trade name Weatherford, or by other manufacturers.

Located outward of the centralizers, i.e. above the centralizer assembly 16 and below the centralizer assembly 17, are a pair of sealed housings 20 and 21 which contain the canisters of electronic equipment for the many channels of information from the search coils in the detector shoes. These housings are sealed against the high pressures encountered, and as will be explained the canisters containing the electronic equipment include an elongated assembly which passes through the centralizer assemblies for maximum utilization of space, also taking maximum advantage of the heat dissipation character of the structure. Each of the housings 20 and 21 includes an access collar 22 or 23, respectively, to permit ready access to the electronics assembly for adjusting the gain of the amplifiers in the many channels, these collars of course being sealed in the position shown. The collars slide axially along the housings to expose access holes.

The entire assembly is suspended by an armored cable 25 which engages a so-called "fishing neck" of standard construction which in this case includes a rubber bumper 26 and a housing 27 for anchoring the steel covering of the cable 25 and providing couplings for the electrical conductors in the cable. The lower end of the housing 27 is connected in a sealed manner to the upper end of the housing 20 for the electronics package. The extreme lower tip of the assembly would include a bumper 28.

The maximum diameter of any part of the entire assembly of FIG. 1 must be less than the minimum ID of the casing 10 through which the sonde must be pulled. On the other hand, the radial distance between the surfaces of the pole pieces 11 and 12 and the casing, producing air gaps 29 and 30, should be as short as possible to reduce the reluctance in the magnetic circuit. Also it may be noted that well casing such as the casing 10 is manufactured in many standard sizes, and as a practical matter a different diameter sonde cannot be manufactured for each casing ID. Thus the diameter of the pole pieces 11 and 12 would have to be smaller than the minimum ID of the smallest standard casing size in which a particular design of the sonde is to be used. In order to partially alleviate the resultant wide air gaps 29 and 30 when used with a slightly larger casing, sleeves 31 and 32 of magnetic material may be positioned over the pole pieces 11 and 12 to extend the effective diameter of the pole pieces for larger pipe. The sleeves 31 and 32 are of ID just slightly greater than the maximum ID of any other part of the entire assembly of FIG. 1 so that these sleeves may be fitted onto the pole pieces 11 and 12 without disassembling the entire unit. The pole pieces 11 and 12 underneath the sleeves 31 and 32 would be just slightly stepped in diameter, increasing toward the center of the unit or toward the detectors 15, to aid in fitting the sleeves quite closely over the pole pieces, whereas the effect of the steps when the sleeves are not used on the magnetic flux pattern is negligible.

Figure 3:
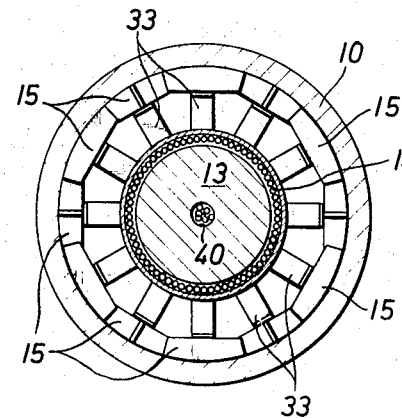
FIG. 3 is a sectional view of the central portion of the apparatus of FIG. 1 taken along the line 3—3 in FIG. 1.
Figure 2:
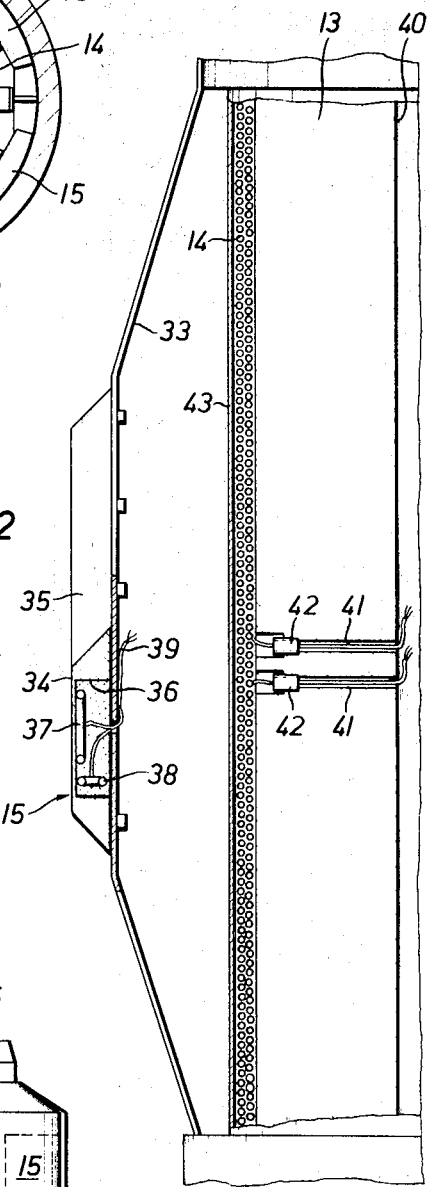
FIG. 2 is a detail view in section of the magnetizer and detector portion of the apparatus of FIG. 1.
Figure 4:
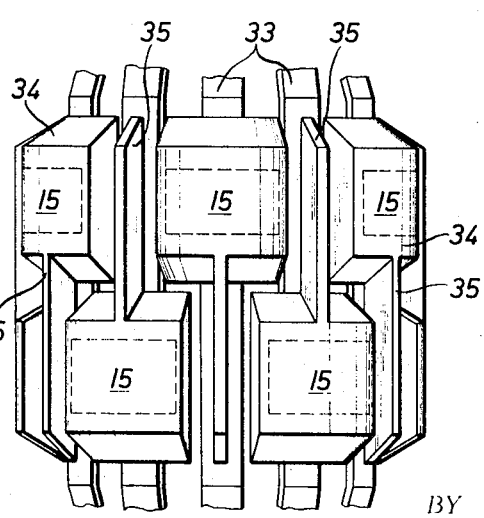
FIG. 4 is a pictorial view of the detector shoes in the central portion of the apparatus of FIG. 1.

Referring now to FIG. 2, as well as to the views of FIGS. 3 and 4, the structure of the detector shoes will be considered in more detail. It is noted that each of the shoes 15 is mounted on a spring member 33 which is formed in a manner such that the shoes are urged outward against the casing wall. The upper and lower ends of the spring members 33 are mounted as will be later described. The shoes 15 are secured to the central part of the spring members 33 by suitable fasteners such as screws. Each of the shoes 15 includes a detector housing portion 34 and an elongated outrigger 35. Adjacent ones of the detector shoes 15 have the outriggers 35 pointing in opposite directions so that the detector portions or housings 34 form an overlapping or staggered array as best seen in FIG. 4 to assure full 360° scanning of the casing wall. The array of detector shoes defines two axially spaced bands of detectors. The curvature of the outer face of the housing portions 34 of the detector shoes 15 would approximately correspond to the curvature of the ID of the pipe 10 for nominal wall thickness as perhaps best seen in FIG. 3. However, this curvature would provide an approximate fit for deviations from nominal pipe diameter or pipe ID of perhaps plus or minus ½". This permits the same sonde to be used with nominal casing sizes over a narrow range. In addition, the detection function would be operative when passing through major restrictions in the casing as at junctions. When the array of FIG. 4 expands and contracts for changes in pipe ID, the actual detector coils within adjacent shoes will still overlap so the entire circumference is scanned.

The functions of the outriggers 35 are several. First it will be understood that the length, in a vertical direction as seen in the figures or in an operative position in the well casing, should be as short as possible for the detector shoes, as well as for the entire assembly. That is, the distance between the pole pieces 11 and 12 should be as short as possible consistent with as adequate detection function to reduce the power requirements for the magnetizer and reduce the overall weight of the assembly, and thus minimize the initial cost, maintenance, and operating expense of the inspection apparatus. In this regard it might be noted that it is not uncommon to encounter well casing of inside diameter of ten inches to twelve inches. Since the pole pieces 11 and 12 must be close to the interior surface of the casing, so that the air gaps 29 and 30 will be a minimum, and since the core 13 extends along the entire length from the top of the pole piece 11 to the bottom of the pole piece 12 at a diameter to provide a cross-section exceeding the area of the casing wall, it is apparent that the weight of the assembly of FIG. 1 which must be lowered down hole may be quite heavy. For this reason its length must be minimized. However, the detector apparatus will encounter junctures in the pipe about every 30 feet, and at each juncture will be a gap which may be of varying width depending upon the extent to which the two adjoining joints or sections of casing are fitted together or torqued in tightening the threaded parts. If the gap happens to be a maximum, a detector shoe having a small axial length, i.e., length parallel to the axis of the casing, the shoe could drop into the gap and engage the threads of the collar, producing excessive abrasion. Also the shoes catch upon the oncoming edge and tend to rip the detector shoe away from the suspension springs. Even if the encounter with a gap of this type were not catastrophic, the vibration, chatter and bouncing of the detector shoes caused by the shoes being allowed to drop into the gap would create excessive noise in the log or record. Accordingly, the overall length of the housing 34 and outrigger 35 is sufficient to prevent the shoes from dropping into gaps which would be encountered.

In addition to the function of the outriggers 35 in bridging the gap between adjacent pipe sections, the outriggers also aid in assuring that the detector shoes will ride flat. Friction caused by the face of the detector shoe engaging the casing wall might cause the front or leading edge of the shoe to heel and permit the trailing edge to ride up or chatter off the wall. This tendency would be enhanced by having housings 34 of short length as for optimum shortening of the overall assembly. Thus, the outriggers produce a long effective length while providing a short housing 34 and minimum length of the overall array. Also the length provided by the outriggers serves to equalize the load on the two spring segments of the spring members 33, aiding in avoiding canting or heeling of the shoes in operation. That is, the length equalizes the dragging friction or spreads it out over a longer axial length.

Within the housing portion 34 of the detector shoe 15 is provided a recess 36 into which is positioned adjacent, or perhaps overlapping, search coils 38 which are of the flux leakage detector type. These coils 38 may comprise merely one or more turns of small diameter wire which will of course intercept flux perturbations as may be caused by flaws, cracks or other anomalies in the ferromagnetic pipe walls. In addition, a pair of eddy current flaw detector coils 37 are driven by a high frequency signal and the effect of the adjacent pipe wall as an eddy current load upon the signal at this frequency for each coil is detected. This technique for detection using both flux leakage and eddy current principles is particularly effective in inspection for flaws on both the inside and outside surfaces of the casing wall, and is similar to that set forth in U.S. patent application Serial No. 752,092 filed July 15, 1968; assigned to the assignee of the present invention. Within the cavity 36 of each shoe 15 are located two of the coils 37 and two of the coils 38, thus five conductors are needed for each detector shoe, one for each coil and one ground. These conductors are bunched into a small cable 39 existing through an aperture in the spring member 33 and running along the inside face of the spring up to the top end of the spring, attached to the spring by suitable fasteners (not shown). The recess 36 in each detector shoe 15 is filled and sealed by a suitable potting material which holds the coils in place. It is noted that the shoe assembly is subjected to the full pressure within the well, so cavities within the detector shoe 15 which might be at atmospheric pressure are to be avoided, but this is not always possible. The coils and conductors with the necessary soldered joints within the shoe preferably are sealed against moisture by an epoxy.

Referring to FIG. 2 and 3, the core 13 for the magnetizer includes a small central bore 40 through which all of the electrical conductors for the assembly are threaded. This bore 40 passes also through the two pole pieces 11 and 12. The bore 40 should be as small as possible so as to avoid reducing the effective cross-sectional area of the core. The bore 40 communicates at each end thereof with the chambers which contain the canisters of electronic equipment in the housings 20 and 21, and so this bore 40 is at admospheric pressure and thus must be sealed against the high pressures encountered in the well.

The two conductors for the magnetizing winding 14 are connected to the central bore 40 by narrow radial bores 41 which are counterbored at their outer ends and include threaded or otherwise sealed connectors 42 for sealing against the high pressures involved. In addition, the epoxy impregnated windings themselves overlying the holes for the connectors 42 aid in sealing, and further a nonmagnetic sleeve 43 overlies the windings and is sealed at each end by an annular O-ring 44 (seen in FIGS. 5 and 7). Thus connection is made to the magnetizer winding 14 from the central bore 40 without unduly restricting the magnetic flux path in the core 13 as might be necessary if the entire pressure differential was borne by a conventional connector between the OD of the core 13 and the central bore 40.

Figure 5:
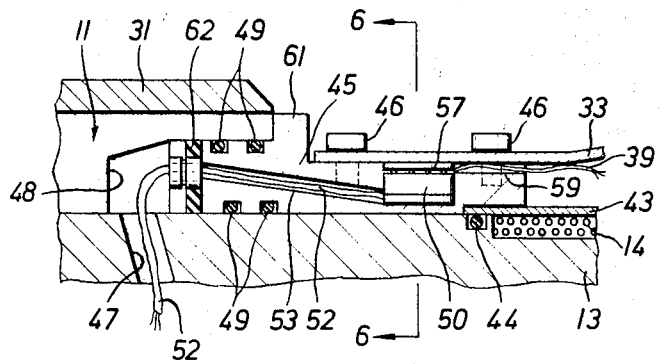
FIG. 5 is a detail view in section of the upper part of the detector shoe spring mounting arrangement.
Figure 6:
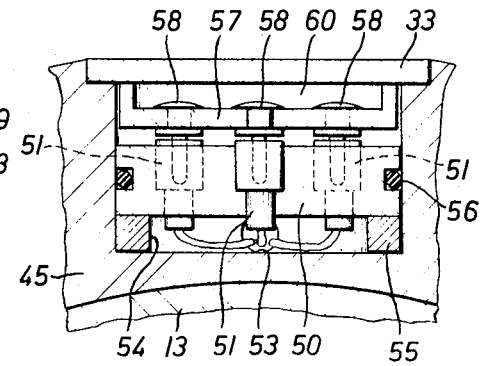
FIG. 6 is a section of a part of the structure of FIG. 5, taken along the line 6—6 in FIG. 5.

The connection of the upper ends of the spring members 33, and the coupling for the cables 39 into the central bore 40, is illustrated in FIGS. 5 and 6. An annular ring 45 surrounds the upper end of the core 13 just beneath the pole piece 11. All twelve of the springs 33 are secured to slots in the outer face of the annular ring 45 by fasteners such as bolts 46. Several radial bores 47 extend inward to open into the central bore 40 of the core 13, and an annular chamber 48 communicating with these bores 47 provides the passage for the electrical conductors. The bores 47 and chamber 48, just as the center bore 40, will be at atmospheric pressure whereas the outer face of the ring 45 will be exposed to well pressure at up to 12,000 p.s.i. Accordingly, sealing is provided by pairs of annular O-rings 49 between the ID of the ring 45 and the outer surface of the core 13, as well as between the OD of the ring 45 and the ID of a recess in the pole piece 11. Twelve small female connector sockets 50 fit within recesses in the ring 45, each connector having five sockets 51 for the five conductors from each detector shoe. Wires soldered to the lower terminals of the sockets 51 are bunched and brought out as a cable 52 through bore 53, through gasket 62, then the cable 52 continues and passes through the radial bores 47 into the central bore 40. It is noted that five conductors for each of twelve shoes make necessary sixty conductors coupled from the outer face or the detector shoes to the inner bore of the core 13. A conventional sixty conductor connector able to withstand a pressure differential of 12,000 p.s.i. would occupy a large part of the entire cross-sectional area of the core 13, thus it is necessary to effect the seal in a structure external to the core 13, preferably by a structure which is principally axially or circumferentially aligned, as distinguished from radially oriented, so as not to use up the cross-sectional core area. Restrictions of the area of the core 13 would of course increase the reluctance of the magnetic circuit and require a larger overall structure and more power dissipated in the magnetizer winding. To this end, the seal is effected at and below the female connector 50. A cavity 54 beneath the connector 50, defined with the aid of an annular ring 55 which limits the depth the female connector 50 can move into its recess in the ring 45, provides a sealing volume which is filled with a suitable sealant such as epoxy. A quantity of sealant is placed in the recess before the female connector 50 is inserted, then as the connector 50 is pushed in, an annular O-ring 56 aids in permitting the female connector to act as a piston to force the sealant into all crevices of the recess 54 and into the bore 53 surrounding the cable 52. The sockets 51 are of course molded into the conector 50 and thus are fairly well sealed, while the combination of the sealant within the recess 54 and the bore 53 along with O-ring 56 provides the necessary seal within the ring 45 rather than occupying radial space within the core.

Also seen in FIGS. 5 and 6, a connector plug 57 having five pins 58 mating with the five sockets 51 is connected to the inner face of the end of the spring member 33. There are of course twelve of these male connectors 57, one for each detector shoe and spring assembly. The cable 39 passes through a slot 59 at the lower outside face of the ring 45 into a recess 60 in the connector 57 where the five individual wires are soldered to the tops of the pins 58. The recess 60 may of course be filled with a sealant after the solder connections are made, although this sealant is not to withstand the pressure differential but instead to keep moisture away from the solder connections. It is noted that the twelve spring members 33 along with the connectors 57 attached thereto may be removed without disturbing the seal, it being necessary to sometimes remove the detector shoes to replace defective units in the field. It is noted that the ring 45 includes an outwardly extending lip 61 seen in FIG. 5 which engages the lower end of the pole piece 11 so that the ring 45 will not be forced into the recess 48 due to the pressure differential existing between the outer-lower face of the ring 45 and the recess 48. An annular gasket 62 is positioned at the inner face of the ring 45.

Figure 7:
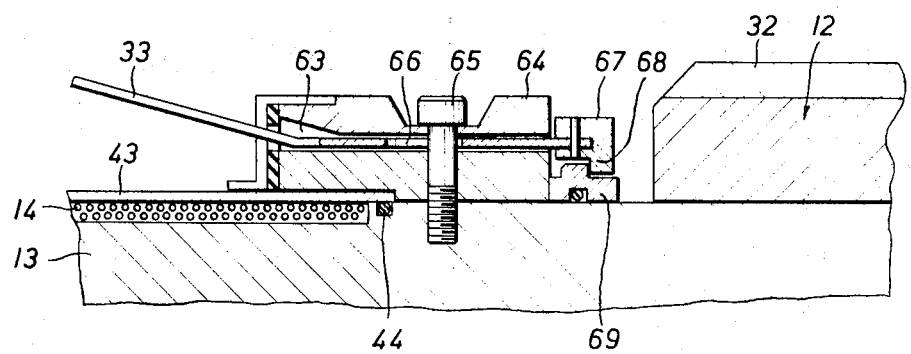
FIG. 7 is a detail view in section of the lower end of the spring mounting arrangement for the detector shoes at one operative position.

Referring now to FIG. 7, the slidable mounting arrangement for the lower end of the spring members 33 is illustrated. The twelve springs 33 terminate in twelve slots 63 within an annular ring 64 which is secured to the core 13 by suitable fasteners 65 such as bolts. The lower ends of the spring members 33 include slots 66 which permit the springs to slide within the slots 63, moving with respect to the bolts 65. This sliding action is necessary to permit the springs to flex inward as the diameter of the casing changes or as obstructions or collars are encountered. The springs 33 are individually suspended by this arrangement to move independently of one another.

Figure 8:
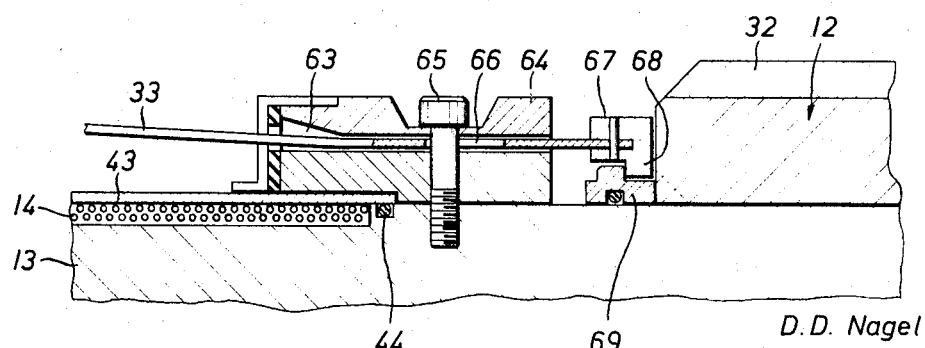
FIG. 8 is a view as in FIG. 7 at another operative position.

At one stage in the operation it may be desired to hold all of the shoes in a retracted position close to the core 13, and for this purpose a detent arrangement is provided at the lower tip of the spring members. At the lower end of each member 33 is positioned a detent 67 which includes an inwardly extending ear 68. A ring 69 surrounds the core 13 at this position, and includes an outwardly extending lip to engage the ears 68. When the ring 69 is in the position shown in FIG. 7, the springs are free to move with no restrictions. However, if all of the detector shoes 15 are pushed inward so that all of the springs 33 flex inward to the maximum extent, the detent member 67 will move to the right to a position as seen in FIG. 8. Now the ring 69 may be moved up against the ears 68 of the detents by a suitable tool inserted into the area to the left of the ring 69. The magnetizer winding 14 would now be energized, and the magnetic field created in the core 13 and pole piece 12 would be sufficient to hold the ring 69 in the position shown in FIG. 8 and prevent the detents 67 from moving to the left, thus preventing the springs 33 from flexing outward. So long as the magnetizer remains energized the detector shoes will remain in the retracted position. This feature would be utilized to lower the sonde all the way to the bottom of the well while holding the shoes in the retracted condition by keeping the magnetizer winding energized. When at the bottom of the well, the magnetizer winding would be de-energized to permit the action of the springs 33 to pull the detents 67 and the ring 69 upward, or to the left in the view of FIGS. 7 and 8. The magnetizer winding 14 would be energized again, but the magnetic field produced would not be sufficient to pull the ring 69 back toward the pole piece, but instead the ring 69 would stay in the position of FIG. 7. The shoes 15 and springs 33 would be free to flex inward or outward as necessary. To prevent the detents 67 from sticking against the pole piece 12 when it is magnetized, the detents 67 should be of nonmagnetic material. To increase the holding power for the ring 69, a slanting recess as indicated by a dotted line in FIG. 8 may be used, the ring 69 being shaped accordingly.

What is claimed is:

1. Inspection apparatus for inspecting pipe, such as well casing or the like comprising
   an elongated magnetizer assembly including a pair of generally cylindrical elongated pole pieces having a diameter slightly less than the inside diameter of the casing,
   a central core between said pole pieces, the core having a diameter slightly less than that of the pole pieces,
   a magnetizing winding surrounding said core,
   detector means comprising a plurality of detector shoes positioned between said pole pieces in a cylindrical array surrounding said core, the detector shoes being adapted to engage the interior surface of the casing to scan substantially the entire circumference thereof,
   the detector shoes being arranged in a pair of axially spaced bands, each detector shoe including an elongated outrigger fixed thereto and extending axially in the direction of the other band of detector shoes, the outrigger of each shoe being adapted to contact the inner surface of the casing and extending between a pair of detector shoes in the other band.

2. The inspection apparatus claimed in claim 1 and further including
   a plurality of elongated spring means for respectively mounting each of said detector shoes, each spring means extending axially between said pole pieces, one end of each of the spring means being slidably connected relative to said core to permit flexing of the spring means, means for selectively engaging said one end of each of the spring means in a flattened condition to thus hold the detector shoes retracted from an inspection position.

3. The inspection apparatus claimed in claim 2 wherein the means for selectively engaging said one end of each of the spring means includes magnetic means operable upon energization of the magnetizing winding.

4. The inspection apparatus claimed in claim 3 wherein said one end of each of the spring means includes magnetic means which is held fixed to a magnetized pole piece when the magnetizing winding is energized to a given condition.

References Cited

UNITED STATES PATENTS

| | | | |
|---|---|---|---|
| 2,719,948 | 10/1955 | Zimmerman | 324—34.1 |
| 3,051,892 | 8/1962 | Houston | 324—34 |
| 3,225,293 | 12/1965 | Wood et al. | 324—37 |
| 3,271,664 | 9/1966 | Mountz et al. | 324—40 |
| 3,434,046 | 3/1969 | Wilson et al. | 324—34 |
| 3,437,810 | 4/1969 | Wood et al. | 324—37 |
| 3,449,662 | 6/1969 | Wood | 324—37 |

ALFRED E. SMITH, Primary Examiner

R. J. CORCORAN, Assistant Examiner